US009369286B2

(12) United States Patent
Shukla et al.

(10) Patent No.: US 9,369,286 B2
(45) Date of Patent: Jun. 14, 2016

(54) SYSTEM AND METHODS FOR FACILITATING AUTHENTICATION OF AN ELECTRONIC DEVICE ACCESSING PLURALITY OF MOBILE APPLICATIONS

(71) Applicant: Tata Consultancy Services Limited, Mumbai (IN)

(72) Inventors: Kartikey Shukla, Mumbai (IN); Nishant Singh, Mumbai (IN); Kalidas Krishna Shetty, Mumbai (IN); Shishir Tiwari, Mumbai (IN); Nisha Yohannan, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 274 days.

(21) Appl. No.: 14/242,660

(22) Filed: Apr. 1, 2014

(65) Prior Publication Data

US 2015/0149766 A1    May 28, 2015

(30) Foreign Application Priority Data

Nov. 27, 2013  (IN) .......................... 3727/MUM/2013

(51) Int. Cl.
*H04L 29/06* (2006.01)
*H04L 9/32* (2006.01)
*H04W 12/06* (2009.01)

(52) U.S. Cl.
CPC .......... *H04L 9/3247* (2013.01); *H04L 63/0815* (2013.01); *H04W 12/06* (2013.01)

(58) Field of Classification Search
USPC ......................................................... 713/155
See application file for complete search history.

(56) References Cited

U.S. PATENT DOCUMENTS

| 8,141,140 B2 | 3/2012 | Wenzel et al. |
| 2013/0086669 A1 | 4/2013 | Sondhi et al. |

(Continued)

FOREIGN PATENT DOCUMENTS

| CN | 102655494 A | 8/2012 |
| CN | 101521660 B | 10/2012 |
| GB | 2494834 A | 3/2013 |

OTHER PUBLICATIONS

"Single Sign-On for Desktop and Mobile Applications using SAML and OAuth", Developer force.

(Continued)

*Primary Examiner* — Tu Nguyen
(74) *Attorney, Agent, or Firm* — Thompson Hine LLP

(57) ABSTRACT

Systems and methods for facilitating authentication of an electronic device accessing plurality of mobile applications are disclosed. The system may receive a device public key and authentication information of the electronic device. The system may validate the authentication information to initiate a device session with the electronic device and create an authentication token signed with a server signature. The system may enable the electronic device to access a first mobile application based on the authentication information validated. Further, the system may receive the authentication token signed with a device signature. The system may authorize the authentication token by verifying the device signature and the server signature on the authentication token with a device public key and a server public key respectively. The system may then enable the electronic device to access the second mobile application using the authentication token authorized.

14 Claims, 6 Drawing Sheets

(56) References Cited

U.S. PATENT DOCUMENTS

2014/0040628 A1* 2/2014 Fort .................. G06F 21/34
713/182
2014/0082715 A1* 3/2014 Grajek ................ H04L 63/0815
726/8

OTHER PUBLICATIONS

"Single Sign-On for SaaS and Mobile", Centrify Corp.
"IBM Worklight V6.0", IBM Software WebSphere 2013.

* cited by examiner

SYSTEM AND METHODS FOR FACILITATING AUTHENTICATION OF AN ELECTRONIC DEVICE ACCESSING PLURALITY OF MOBILE APPLICATIONS

RELATED APPLICATIONS

This application claims the benefit of Indian patent application No. 3727/MUM/2013, filed Nov. 27, 2013.

TECHNICAL FIELD

The present subject matter described herein, in general, relates to an authentication and authorization of an electronic device, and more particularly to a system and method for facilitating authentication of an electronic device accessing a plurality of mobile applications.

BACKGROUND

With the advancement of Information Technology (IT) and wireless communication technologies, handheld devices such as Smartphones, Tablets, and PDA and the like have been utilized effectively not only to facilitate voice communication but also to provide other services like social networking, e-commerce, and video games etc. These devices provide enhanced user experience, support mobility and enable faster communication. These devices have further been enabled to provide mobile applications installed to facilitate the user of the devices to access and explore the functionalities of each of these mobile applications including social networking, e-commerce, and video games etc.

In order to access the mobile applications, the user may have to be authorized or authenticated by the mobile applications. Since, each mobile application is different and served by a distinct application server, the user has to be authorized or authenticated separately by each of these application servers for accessing each of these mobile applications. The authentication of the user may be facilitated based on login credentials like username and password provided by the user. However, since there may be numerous mobile applications, the user may face a challenge while providing the user's credentials for accessing each of these applications. Further, in certain scenario, the user's credentials may vary with each of the mobile applications and this may further lead to a challenge of memorizing a unique login credential for each of the mobile applications.

Single Sign On (SSO) techniques available today may enable accessing several mobile applications after authentication of the user only once at an instance of accessing a first mobile application of the several mobile applications. The SSO techniques follow a cookie based approach, wherein the cookie stores the login credentials on the device of the user, wherein the login credentials may be provided by the user during accessing the first mobile application which can be validated for accessing the subsequent mobile applications. However, the SSO techniques may be prone to attacks by the intruders since the login credentials are stored locally on the device. Further, the SSO techniques facilitate single sign on for the mobile applications that are hybrid in nature. These mobile applications, also referred as "Hybrid Mobile Applications," may utilize the SSO techniques facilitating single sign on for the browser based applications. However, there are other classes or types of applications called "Native Mobile Applications" which are not browser-based, and hence may not support single sign on using these SSO techniques. Thus, there is a technical challenge to authenticate the user device accessing a plurality of mobile applications comprising a mixture of both the "Hybrid Mobile Applications" and the "Native Mobile Applications" without compromising on the data security and being susceptible to intruder attacks.

SUMMARY

Before the present systems and methods, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present invention. This summary is provided to introduce concepts related to systems and methods for facilitating authentication of an electronic device accessing a plurality of mobile applications and the concepts are further described below in the detailed description. This summary is not intended to identify essential features of the claimed subject matter nor is it intended for use in determining or limiting the scope of the claimed subject matter.

In one implementation, a system for facilitating authentication of an electronic device accessing a plurality of mobile applications is disclosed. In one aspect, the system may comprise a processor and a memory coupled to the processor. The processor may be capable of executing a set of instructions stored in the memory. The set of instructions may comprise instructions for receiving a device public key of the electronic device and authentication information of the electronic device from a first application server associated with a first mobile application installed on the electronic device. The set of instructions may comprise instructions for validating the authentication information using reference data stored in an active directory. The set of instructions may comprise instructions for creating an authentication token for the electronic device post-validation of the authentication information. The set of instructions may comprise instructions for signing the authentication token with a server signature using a server private key. Further, the set of instructions may comprise instructions for transmitting the authentication token to the electronic device via the first application server post-signing. The authentication token transmitted to the electronic device may be further accessible to a second application server associated with a second mobile application installed on the electronic device. The set of instructions may comprise instructions for enabling the electronic device to access the first mobile application based on the authentication information validated. Further, the set of instructions may comprise instructions for receiving the authentication token from a second application server associated with a second mobile application installed on the electronic device. The authentication token received from the second application server may be signed with a device signature using a device private key. The set of instructions may comprise instructions for authorizing the authentication token by verifying the device signature and the server signature on the authentication token using the device public key and a server public key respectively. Further, the set of instructions may comprise instructions for transmitting, after the authorization, the authentication token to the electronic device via the second application server. The set of instructions may comprise instructions for enabling the electronic device to access the second mobile application using the authentication token authorized.

In another implementation, a method for facilitating authentication of an electronic device accessing a plurality of mobile applications is disclosed. The method may comprise one or more steps performed by a processor using a set of instructions stored in a memory. The method may comprise receiving a device public key of the electronic device and authentication information of the electronic device from a first application server associated with a first mobile application installed on the electronic device. The method may comprise validating the authentication information using reference data stored in an active directory. The method may comprise creating an authentication token for the electronic device post-validation of the authentication information. The method may comprise signing the authentication token with a server signature using a server private key. Further, the method may comprise transmitting the authentication token to the electronic device via the first application server post-signing. The authentication token transmitted to the electronic device may be further accessible to a second application server associated with a second mobile application installed on the electronic device. The method may comprise enabling the electronic device to access the first mobile application based on the authentication information validated. Further, the method may comprise receiving the authentication token from a second application server associated with a second mobile application installed on the electronic device. The authentication token received from the second application server may be signed with a device signature using a device private key. The method may comprise authorizing the authentication token by verifying the device signature and the server signature on the authentication token using the device public key and a server public key respectively. Further, the method may comprise transmitting, after the authorization, the authentication token to the electronic device via the second application server. The method may comprise enabling the electronic device to access the second mobile application using the authentication token authorized.

In yet another implementation, a computer program product having a non-transitory computer readable storage medium having a computer program for facilitating authentication of an electronic device accessing a plurality of mobile applications is disclosed. The computer program may comprise instructions for receiving a device public key of the electronic device and authentication information of the electronic device from a first application server associated with a first mobile application installed on the electronic device. The computer program may comprise instructions for validating the authentication information using reference data stored in an active directory. The computer program may comprise instructions for creating an authentication token for the electronic device post-validation of the authentication information. The computer program may comprise instructions for signing the authentication token with a server signature using a server private key. Further, the computer program may comprise instructions for transmitting the authentication token to the electronic device via the first application server post-signing. The authentication token transmitted to the electronic device may be further accessible to a second application server associated with a second mobile application installed on the electronic device. The computer program may comprise instructions for enabling the electronic device to access the first mobile application based on the authentication information validated. Further, the computer program may comprise instructions for receiving the authentication token from a second application server associated with a second mobile application installed on the electronic device. The authentication token received from the second application server may be signed with a device signature using a device private key. The computer program may comprise instructions for authorizing the authentication token by verifying the device signature and the server signature on the authentication token using the device public key and a server public key respectively. Further, the computer program may comprise instructions for transmitting, after the authorization, the authentication token to the electronic device via the second application server. The computer program may comprise instructions for enabling the electronic device to access the second mobile application using the authentication token authorized.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
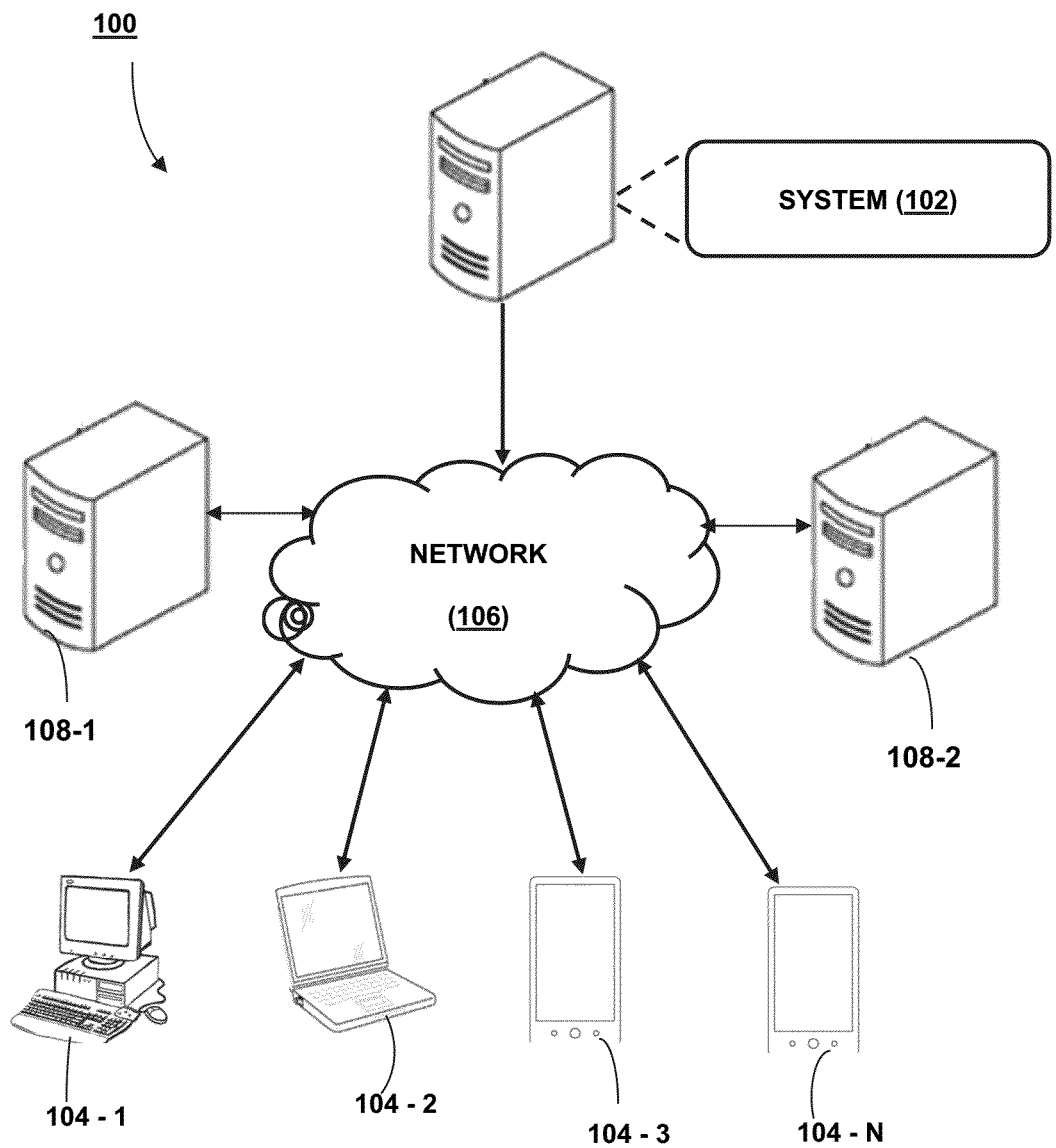
FIG. 1 illustrates a network implementation of a system for facilitating authentication of an electronic device accessing a plurality of mobile applications, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Systems and methods for facilitating authentication of an electronic device accessing a plurality of mobile applications are described. In one aspect, the mobile applications may be either hybrid or native mobile applications which may be installed on the electronic device. The electronic device may be one of a Smartphone, a mobile device, a tablet computer and the like. The user of the electronic device may request to access a first mobile application installed on the electronic device. The first mobile application may check whether there exists any authentication token stored in a memory unit of the electronic device. After verifying non-existence of the authentication token, the first mobile application may receive authentication information like user-ID and password from the user. After receipt of the authentication information, a device public key and a device private key associated to the electronic device may be generated. The device private key may be stored on a secured storage of a memory unit of the electronic device. Further, the device public key and the authentication information may be transmitted to a single sign on server. While the device public key may be directly transmitted by the first mobile application installed on the electronic device, the authentication information may be transmitted from the first mobile application via the first application server.

Subsequent to the receipt of the authentication information, the single sign on server may validate the authentication information using reference data stored in an active directory. The reference data may comprise authentication data pre-registered for a plurality of users associated with a plurality of electronic devices. Specifically, the reference data may be matched with the authentication information in order to confirm the authenticity of the user associated with the electronic device. Post-validation, the single sign on server may initiate a device session with the electronic device. The device session may be initiated by creating a table entry for the device public key of the electronic device. Subsequent to the initiation of the device session, an authentication token may be created for the electronic device. The authentication token may be based on Security Assertion Markup Language (SAML) format. The authentication token, also referred hereinafter as a SAML token may be signed with a server signature using a server private key. The SAML token may then be transmitted to the electronic device via the first application server. The SAML token may be stored on the secured storage of the electronic device. The electronic device may then access the first mobile application based on the validation of the user-ID and the password.

Now, when the electronic device request for accessing a second mobile application installed on the electronic device, the second mobile application may check for the availability of the SAML token on the secured storage of the electronic device. Since, the SAML token is available; the electronic device may sign the SAML token with a device signature using the device private key. After the signing, the electronic device may transmit the SAML token to a second application server to ensure whether an application session is created at the second application server for the electronic device. After verifying non-existence of the application session, the second application server may transmit the SAML token to the single sign on server for verifying the device session created for the electronic device by the single sign on server. After receipt of the SAML token, the single sign on server may authorize the SAML token based on the device session initiated for the electronic device. Specifically, the SAML token may be validated based on the table entry created corresponding to the device public key of the electronic device at the single sign on server. More particularly, the SAML token is validated by verifying the device signature and the server signature on the SAML token using the device public key and the server public key respectively. After the authorization of the SAML token, the SAML token may then be transmitted to the electronic device via the second application server. The SAML token may be stored on the secured storage of the electronic device. The electronic device may then access the second mobile application using the SAML token via an application session created by the second application server. In one aspect, the server signature and the device signature may be a "digital signature" or an "electronic signature" that may ensure authenticity or validity of the authentication token.

While aspects of described system and method for facilitating authentication of an electronic device accessing a plurality of mobile applications may be implemented in any number of different computing systems, environments, and/or configurations, the embodiments are described in the context of the following exemplary system.

Referring now to FIG. 1, a network implementation 100 of a system 102 for facilitating authentication of an electronic device accessing a plurality of mobile applications is disclosed. The system 102 may receive a device public key of the electronic device and authentication information of the electronic device from a first application server associated with a first mobile application installed on the electronic device. The system 102 may validate the authentication information using reference data stored in an active directory. Further, the system 102 may create an authentication token for the electronic device post-validation of the authentication information. The system 102 may sign the authentication token with a server signature using a server private key. Further, the system 102 may transmit the authentication token to the electronic device via the first application server post-signing. The system 102 may enable the electronic device to access the first mobile application based on the authentication information validated. Further, the system 102 may receive the authentication token from a second application server associated with a second mobile application installed on the electronic device. The authentication token received from the second application server may be signed with a device signature using a device private key. The system 102 may authorize the first authentication token by verifying the device signature and the server signature on the authentication token using the device public key and a server public key respectively. Further, the system 102 may transmit, after the authorization, the authentication token to the electronic device via the second application server. The system 102 may enable the electronic device to access the second mobile application using the authentication token authorized.

Although the present subject matter is explained considering that the system 102 is implemented on a single sign on server, it may be understood that the system 102 may also be implemented in a variety of computing systems, such as a laptop computer, a desktop computer, a notebook, a workstation, a mainframe computer, a server, a network server, a cloud-based computing environment and the like. It will be understood that the system 102 may be accessed by multiple users through one or more electronic devices 104-1, 104-2, 104-3 . . . 104-N, collectively referred to as an electronic device 104. In one implementation, the system 102 may comprise the cloud-based computing environment in which a user may operate individual computing systems configured to execute remotely located applications. Examples of the electronic device 104 may include, but are not limited to, a portable computer, a personal digital assistant, a handheld device, a Smartphone, a Tablet Computer and a workstation. The electronic device 104 is communicatively coupled to the system 102 through a network 106. Further, one or more application servers 108-1, 108-2 . . . 108-N, collectively referred to as an application server 108 hereinafter, may be capable of serving the mobile applications residing on the electronic device 104. The electronic device 104 is further communicatively coupled to the application server 108 through the network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
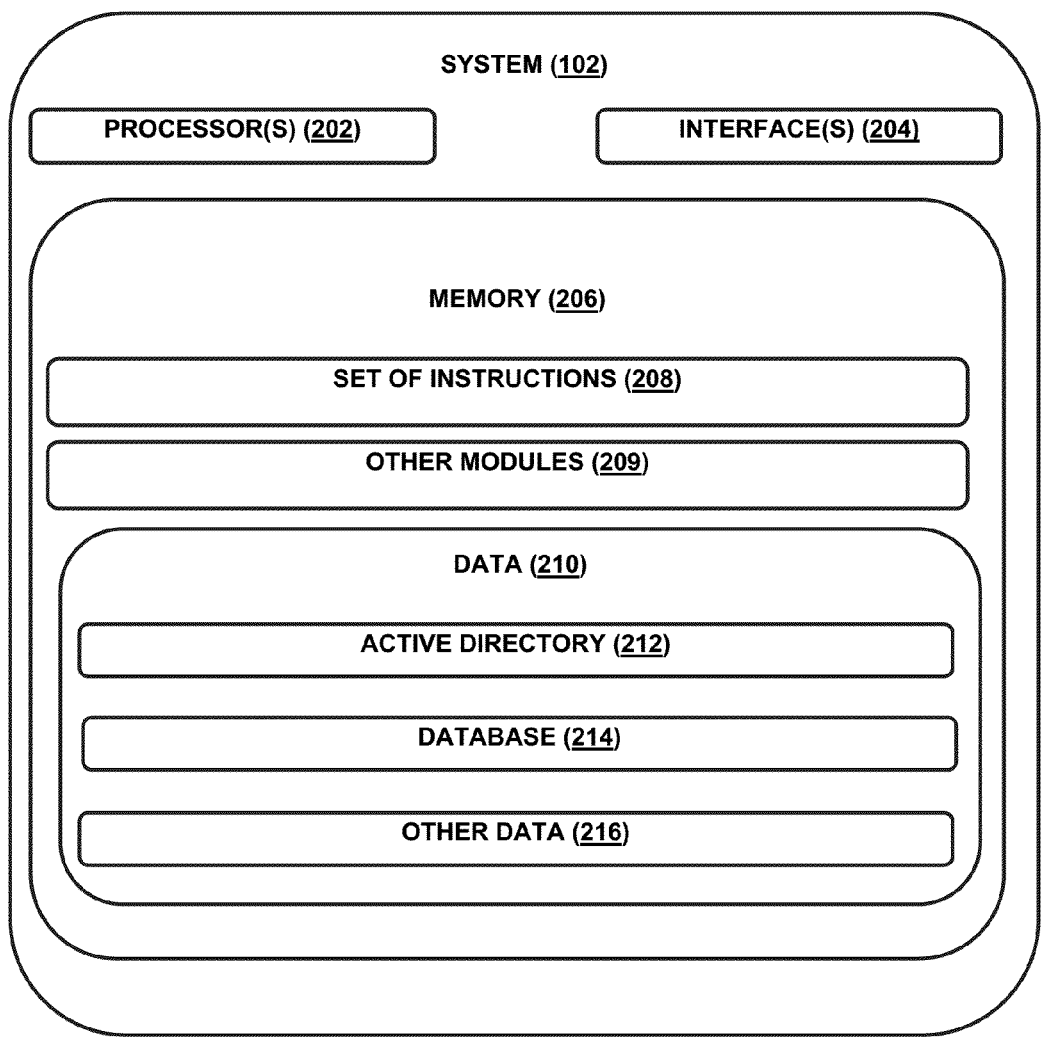
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the electronic device 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include a set of instructions 208, other modules 209 and data 210.

The set of instructions 208 include routines, programs, objects, components, data structures, etc., which perform particular tasks or implement particular abstract data types. In one implementation, set of instructions 208 described herein may be implemented as software modules that may be executed in the cloud-based computing environment of the system 102.

The data 210, amongst other things, serves as a repository for storing data processed, received, and generated by the set of instructions 208. The data 210 may also include an Active Directory 212 (also referred hereinafter as AD 212), a database 214 and other data 216. The other data 216 may include data generated as a result of the execution of one or more modules in the other modules 209. The working of the system 102 may be explained in detail in FIGS. 3, 4, 5(A) and 5(B) as explained below.

Figure 3:
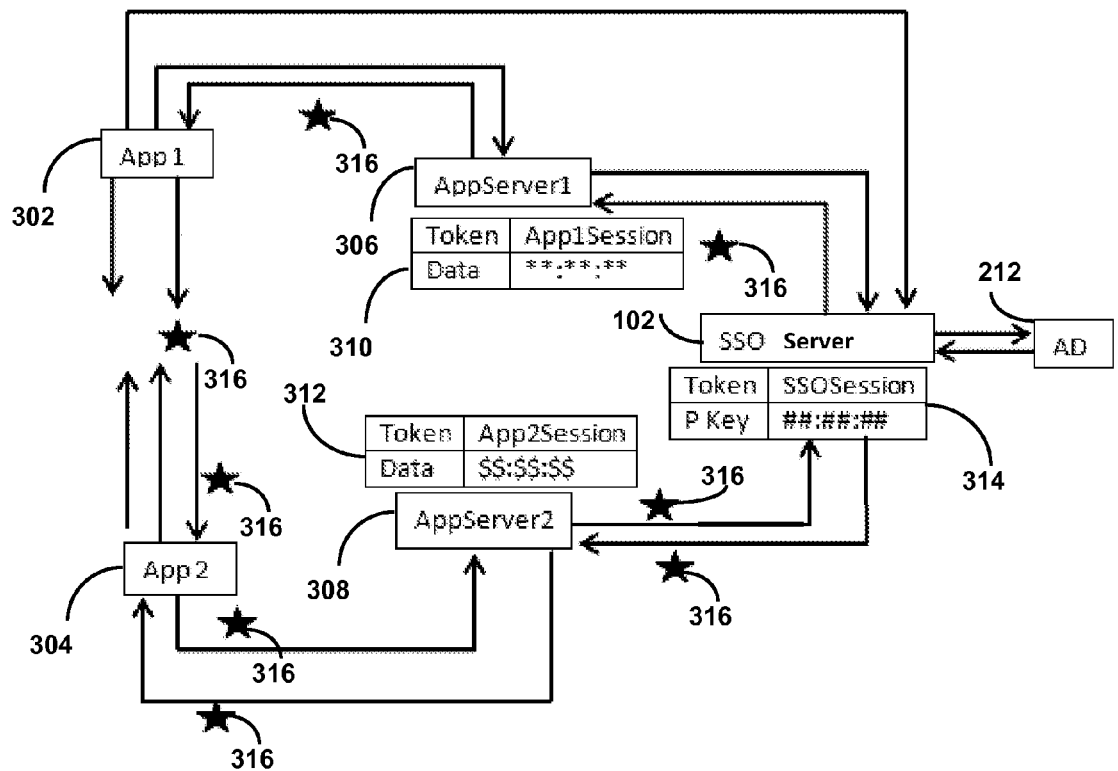
FIG. 3 illustrates a working of the system, in accordance with one embodiment of the present subject matter.

Referring to FIG. 3, a detailed working of the system 102, hereinafter referred to as the SSO server 102 is illustrated, in accordance with one embodiment of the present subject matter. As illustrated, App1 302 and App2 304 are shown which may be installed on the electronic device. In this embodiment, both the App1 302 and the App2 304 may be native mobile applications. Further, the App1 302 and the App2 304 may be communicatively coupled with the SSO server 102. Further, the App1 302 and the App2 304 are communicatively coupled with an AppServer1 306 and an AppServer2 308 respectively. Furthermore, the AppServer1 306 and the AppServer2 308 are communicatively coupled with the SSO server 102.

In response to a request from the user of the electronic device 104 (not shown in FIG. 3), the App1 302 may check for the availability of any SAML token and a device public-private key pair in the secured storage of the memory unit of the electronic device 104. Since the SAML token is not found, the App1 302 may prompt the user of the electronic device to provide the login credentials like UserID and Password for accessing the App1 302. Upon login into App1 302, a device public key and a device private key associated with the electronic device 104 may be generated and stored in the secured storage of the memory unit of the electronic device 104. The App1 302 may transmit the device public key to the SSO server 102 along with device characteristics of the electronic device. The device characteristics may indicate identity information unique to the electronic device. In one example, the identify information may comprise a unique device identifier. Further, the App1 302 may transmit the UserID and the password along with the device characteristics to the AppServer1 306 for authentication. The AppServer1 306 may transmit the UserID, the password and the device characteristics to the SSO server 102 for the authentication. The SSO server 102 may transmit the UserID and the password to the Active Directory (referred as AD) 212 for the authentication. The AD 212 may confirm the UserID and the password to validate the electronic device 104 and the user associated with the electronic device 104.

Subsequent to the validation of the user, a table entry 314 may be made for the device public key for the user in the SSO server 102. Specifically, a device session corresponding to the device public key of the electronic device 104 may be initiated with the creation of the table entry 314. The table entry 314 may map the device public key with the unique device identifier of the electronic device. Further, a SAML token 316 may be generated by the SSO server 102 which is signed with a server signature using a server private key. The server signature and the server private key are associated to the SSO server 102. The SAML token 316 may be transmitted to the AppServer1 306. The AppServer1 306 may create an application session for the user of the electronic device 104. The Appserver1 306 may transmit the SAML token 316 to the App1 302. The App1 302 may store the SAML token 316 in the secured storage of the memory unit of the electronic device 104. Further, the electronic device may access the App1 302 based on the validation of the UserID and the password.

Now, when the user wants to access the App2 304, the App2 304 may check for the SAML token 316 in the secured storage of the memory unit of the electronic device 104. The App2 304 may retrieve the SAML token 316 from the electronic device 104 and then sign the SAML token 316 with a device signature using the device private key. The device signature signed on the SAML token 316 may be associated with the electronic device 104. The App2 304 may then transmit the SAML token 316 to the AppServer2 308 to check if a valid session exists for the SAML token 316 in the AppServer2 308. Since there is no table entry corresponding to the SAML token 316 in the AppServer2 308, the AppServer2 308 may transmit the SAML token 316 to the SSO server 102.

Subsequent to the receipt of the SAML token 316, the SSO server 102 may authorize the SAML token 316 in order to verify the authenticity of the user. Specifically, the SSO server 102 may check for the device session. When the user is found to have the device session, the SSO server 102 may authorize the SAML token 316 by verifying the device signature and the server signature on the SAML token 316 using the device public key and a server public key respectively. The server public key may be associated with the SSO server 102. The App2 304 may store the SAML token 316 in the secured storage of the memory unit of the electronic device 104.

In one embodiment, when the user logs out from the App1 302 before proceeding to access the App2 304, the App1 302 may destroy the existing user session on the electronic device 104. The SAML token 316 may be deleted from the secured storage of the memory unit of the electronic device 104. Now, when the user wants to work with the App2 304, the App2 304 may check for the device public key and the device private key associated with the electronic device along with the SAML token 316. Though the device public key and the device private key may be present, but since the SAML token is not present, the App2 304 may destroy the existing session for the user on the electronic device 104 and may prompt the user for the re-entry of the UserID and the Password.

Figure 4:
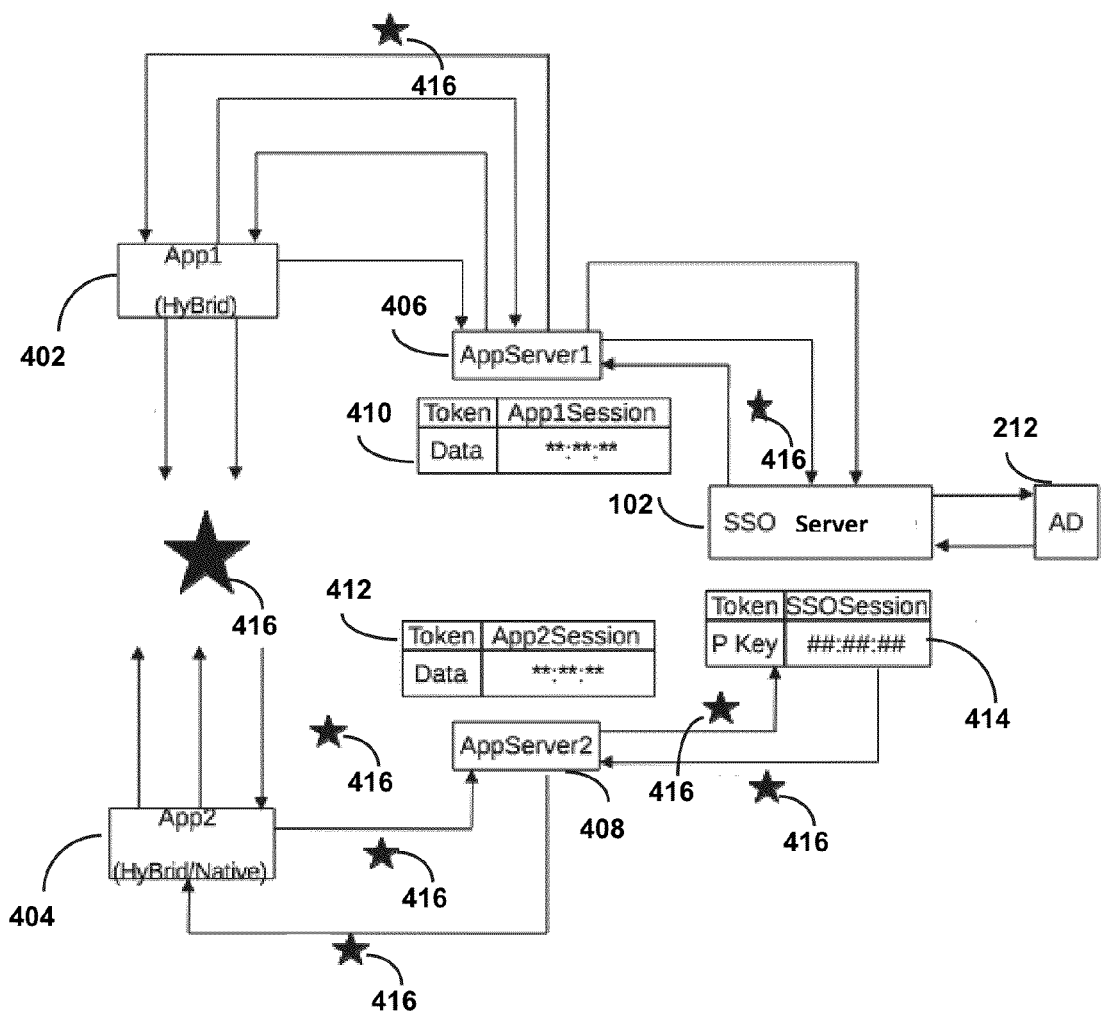
FIG. 4 illustrates a working of the system, in accordance with an embodiment of the present subject matter.

Referring to FIG. 4, a detailed working of the SSO server 102 is illustrated, in accordance with another embodiment of the present subject matter. As illustrated, App1 402 and App2 404 are shown which may be installed on the electronic device. In this embodiment, the App1 402 may be hybrid mobile application and the App2 404 may be either a native mobile application or a hybrid mobile application. Further, the App1 402 and the App2 404 may be communicatively coupled with the SSO server 102. Further, the App1 402 and the App2 404 are communicatively coupled with an AppServer1 406 and an AppServer2 408 respectively. Furthermore, the AppServer1 406 and the AppServer2 408 are communicatively coupled with the SSO server 102.

In response to a request from the user of the electronic device 104 (not shown in FIG. 3), the App1 402 may check for the availability of any SAML token and a device public-private key pair in the secured storage of the memory unit of the electronic device 104. Since both the SAML token and the device public-private key pair are not found, the App1 402 may prompt the user of the electronic device to provide the login credentials like UserID and Password for accessing the App1 402. Upon login into the App1 402, a device public key and a device private key associated with the electronic device 104 may be generated and stored in the secured storage of the memory unit of the electronic device 104. The App1 402 may transmit the device public key to the SSO server 102 along with device characteristics of the electronic device. The device characteristics may indicate identity information unique to the electronic device. In one example, the identity information may comprise a unique device identifier. Further, the App1 402 may transmit the UserID and the password along with the device characteristics to the AppServer1 406 for authentication. The AppServer1 406 may transmit the UserID, the password and the device characteristics to the SSO server 102 for the authentication. The SSO server 102 may transmit the UserID and the password to the Active Directory (referred as AD) 212 for the authentication. The AD 212 may confirm the UserID and the password to validate the electronic device 104 and the user associated with the electronic device 104.

Subsequent to the validation of the user, a table entry 414 may be made for the device public key for the user in the SSO server 102. Specifically, a device session corresponding to the device public key of the electronic device 104 may be initiated with the creation of the table entry 414. The table entry 414 may map the device public key with the unique device identifier of the electronic device. Further, a SAML token 416 may be generated by the SSO server 102 which is signed with a server signature using a server private key. The server signature and the server private key may be associated with the SSO server 102. The SAML token 416 may be transmitted to the AppServer1 406. The AppServer1 406 may transmit the SAML token 416 to the App1 402. The AppServer1 406 may create an application session for the user of the electronic device 104. The AppServer1 406 may redirect to the user page, which the Native Part (WebView Delegates) of the App1 402 may detect and stop the loading of request. The App1 402, using Native Connection Methods, may access the AppServer1 406 with the request stopped. The AppServer1 406 may transmit the SAML token 416 to the App1 402 for the request received by the AppServer1 406 in the response Header (HTTPHeader) and the response body (HTTPBody) contains the home page for the user. The App1 402 may store the SAML token 416 in the secured storage of the memory unit of the electronic device 104. Further, the electronic device may access the App1 402 based on the validation of the UserID and the password.

Now, when the user wants to access the App2 404, the App2 404 may check for the SAML token 416 in the secured storage of the memory unit of the electronic device 104. The App2 404 may retrieve the SAML token 416 from the electronic device 104 and then sign the SAML token 416 with a device signature using the device private key. The device signature signed on the SAML token 416 may be associated with the electronic device 104. The App2 404 may transmit the SAML token 416 to the AppServer2 408 to check if a valid session exists for the SAML token 416 in the AppServer2 408. Since there is no table entry corresponding to the SAML token 416 in the AppServer2 408, the AppServer2 408 may transmit the SAML token 416 to the SSO server 102.

Subsequent to the receipt of the SAML token 416, the SSO server 102 may authorize the SAML token 416 in order to verify the authenticity of the user. Specifically, the SSO server 102 may check for the device session. When the user is found to have the device session, the SSO server 102 may authorize the SAML token 416 by verifying the device signature and the server signature on the SAML token 416 using the device public key and the server public key respectively. The server public key may be associated with the SSO server 102. The App2 406 may store the SAML token 416 in the secured storage of the memory unit of the electronic device 104.

In one embodiment, when the user logs out from the App1 402 before proceeding to access the App2 404, the App1 402 may destroy the existing user session on the electronic device 104. The SAML token 416 may be deleted from the secured storage of the memory unit of the electronic device 104. Now, when the user wants to work with the App2 404, the App2 404 may check for the device public key and the device private key associated with the electronic device along with the SAML token 416. Though the device public key and the device private key may be present, but since the SAML token is not present, the App2 404 may destroy the existing session for the user on the electronic device 104 and may prompt the user for the re-entry of the UserID and the Password.

Figure 5A:
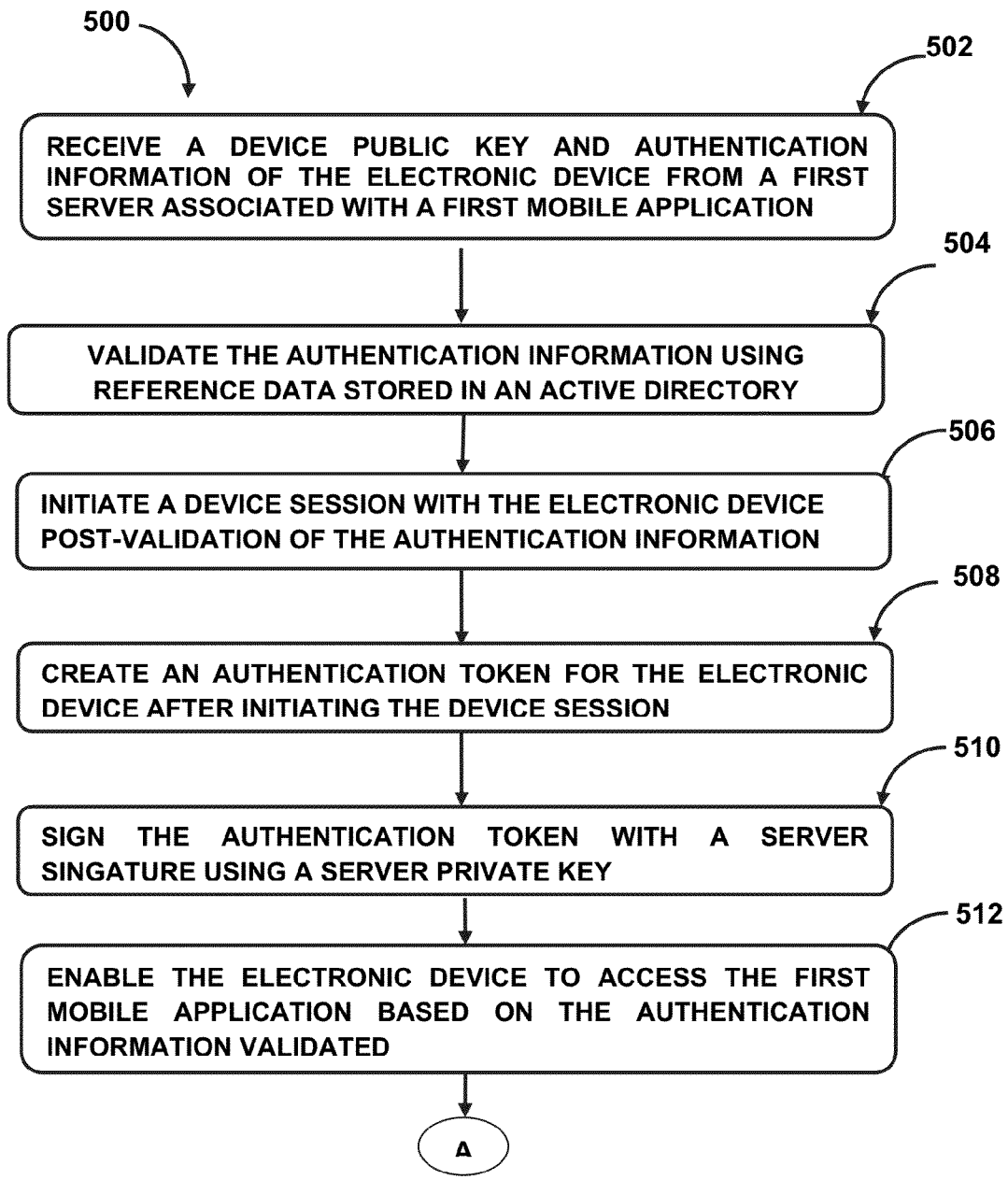
FIGS. 5(A) and 5(B) illustrate a method for facilitating authentication of an electronic device accessing a plurality of mobile applications, in accordance with an embodiment of the present subject matter.
Figure 5B:
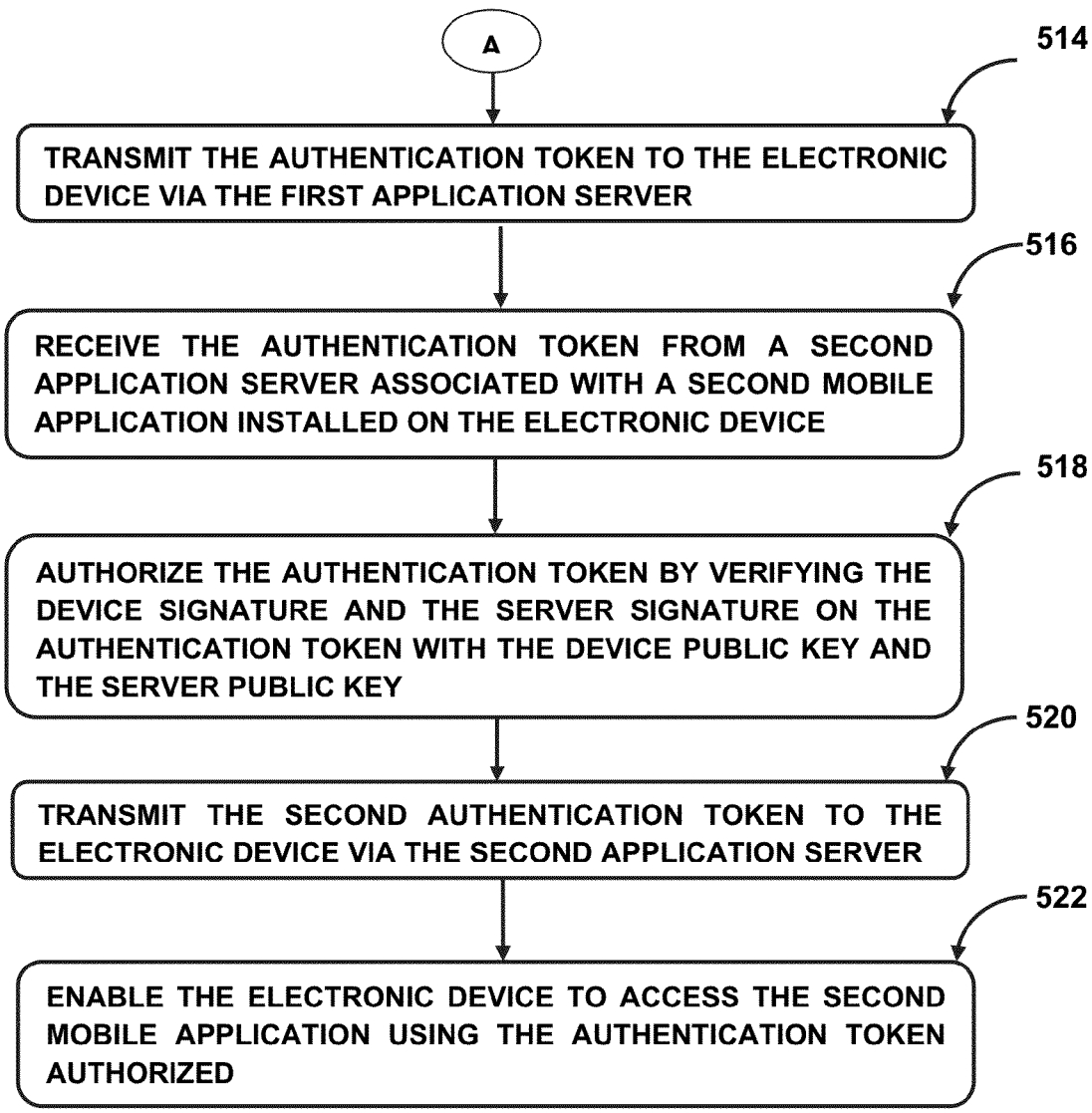

Referring now to FIGS. 5(A) and 5(B), a method 500 for facilitating authentication of an electronic device accessing a plurality of mobile applications is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented as described in the system 102.

At block 502, a device public key and authentication information of the electronic device may be received. In one implementation, the device public key may be received from a first mobile application installed on the electronic device. Further, the authentication information may be received from a first application server associated with the first mobile application.

At block 504, the authentication information may be validated using reference data stored in the active directory 212.

At block 506, a device session may be initiated with the electronic device post-validation of the authentication information.

At block 508, an authentication token for the electronic device may be created after the initiating of the device session.

At block 510, the authentication token may be signed with a server signature using a server private key, wherein the server signature and the server private key are associated with the system 102.

At block 512, the electronic device may be enabled to access the first mobile application based on the authentication information validated.

At block 514, the authentication token may be transmitted to the electronic device from the SSO server 102 via the first application server.

At block 516, the authentication token may be received from a second application server associated with a second mobile application installed on the electronic device. In one implementation, the authentication token received from the second application server may be signed with a device signature using the device private key. Further, the authentication token may be received in order to validate the authentication token for accessing the second mobile application.

At block 518, the authentication token may be authorized based upon the device session initiated for the electronic device. Specifically, the authentication token may be authorized by verifying the device signature and the server signature on the authentication token with the device public key and a server public key respectively. In one implementation the device private key and the device public key are associated with the electronic device. Further, the server private key and the server public key are associated with the system 102.

At block 520, the authentication token, after the authorization, may be transmitted to the electronic device via the second application server.

At block 522, the electronic device may be enabled to access the second mobile application using the authentication token authorized.

Although implementations for methods and systems for the facilitating authentication of an electronic device accessing plurality of mobile applications have been described in language specific to structural features and/or methods, it is to be understood that the appended claims are not necessarily limited to the specific features or methods described. Rather, the specific features and methods are disclosed as examples of implementations for facilitating authentication of an electronic device accessing plurality of mobile applications.

What is claimed is:

1. A method for facilitating authentication of an electronic device accessing a plurality of mobile applications, the method comprising:
   receiving a device public key of the electronic device and authentication information of the electronic device from a first application server associated with a first mobile application installed on the electronic device;
   validating the authentication information using reference data stored in an active directory;
   creating an authentication token for the electronic device post-validation of the authentication information;
   signing the authentication token with a server signature using a server private key, wherein the server signature and the server private key are associated with a system;
   transmitting the authentication token to the electronic device via the first application server post-signing, wherein the authentication token transmitted to the electronic device is further accessible to a second application server, and wherein the second application server is associated with a second mobile application installed on the electronic device;
   enabling the electronic device to access the first mobile application based on the authentication information validated;
   receiving the authentication token from the second application server associated with the second mobile application installed on the electronic device, wherein the authentication token received is signed with a device signature using a device private key, and wherein the device signature and the device private key are associated with the electronic device;
   authorizing the authentication token by verifying the device signature and the server signature on the authentication token using the device public key and a server public key, wherein the server public key is associated with the system;
   transmitting the authentication token authorized to the electronic device via the second application server; and
   enabling the electronic device to access the second mobile application using the authentication token authorized.

2. The method of claim 1, wherein the plurality of mobile applications are native mobile applications or hybrid mobile applications.

3. The method of claim 1, wherein the authentication information comprises login credentials including username and password.

4. The method of claim 1, wherein the electronic device includes a unique device identifier associated with the electronic device.

5. The method of claim 1, wherein the authentication token is based on Security Assertion Markup Language (SAML) format.

6. The method of claim 1, wherein when the first mobile application is a hybrid mobile application, the authentication token is transmitted to the electronic device corresponding to a request received by the first application server, via a response Header (HTTPHeader), and wherein a response body (HTTPBody) from the first application server, corresponding to the request, contains a home page of the first mobile application.

7. The method of claim 1, wherein the authentication token is stored in a memory unit of the electronic device, and wherein the authentication token is deleted from the memory unit once a user is logged out from the first mobile application or the second mobile application.

8. The method of claim 7 further comprises destroying an existing user session on the electronic device, via the first application server or the second application server, once the user is logged out from the first mobile application or the second mobile application.

9. A system for facilitating authentication of an electronic device accessing a plurality of mobile applications, the system comprising:
- a processor; and
- a memory coupled to the processor, wherein the processor is capable of executing a set of instructions stored in the memory, and wherein the set of instructions comprising instructions for:
  - receiving a device public key of the electronic device and authentication information of the electronic device from a first application server associated with a first mobile application installed on the electronic device;
  - validating the authentication information using reference data stored in an active directory;
  - creating an authentication token for the electronic device post-validation of the authentication information;
  - signing the authentication token with a server signature using a server private key, wherein the server signature and the server private key are associated with a system;
  - transmitting the authentication token to the electronic device via the first application server post-signing, wherein the authentication token transmitted to the electronic device is further accessible to a second application server, and wherein the second application server is associated with a second mobile application installed on the electronic device;
  - enabling the electronic device to access the first mobile application based on the validation of the authentication information;
  - receiving the authentication token from the second application server associated with the second mobile application installed on the electronic device, wherein the authentication token received is signed with a device signature using a device private key, and wherein the device signature and the device private key are associated with the electronic device;
  - authorizing the authentication token by verifying the device signature and the server signature on the authentication token using the device public key and a server public key, wherein the server public key is associated with the system;
  - transmitting the authentication token authorized to the electronic device via the second application server; and
  - enabling the electronic device to access the second mobile application using the authentication token authorized.

10. The system of claim 9, wherein the plurality of mobile applications are native mobile applications or hybrid mobile applications.

11. The system of claim 9, wherein the authentication token is based on Security Assertion Markup Language (SAML) format.

12. The system of claim 9, wherein when the first mobile application is a hybrid mobile application, the authentication token is transmitted to the electronic device corresponding to a request received by the first application server, via a response Header (HTTPHeader), and wherein a response body (HTTPBody) from the first application server, corresponding to the request, contains a home page of the first mobile application.

13. The system of claim 12, wherein the authentication token is stored in a memory unit of the electronic device, and wherein the authentication token is deleted from the memory unit once a user is logged out from the first mobile application or the second mobile application.

14. A computer program product having a non-transitory computer readable storage medium having a computer program for facilitating authentication of an electronic device accessing a plurality of mobile applications, the computer program comprising a set of instructions, the set of instructions comprising instructions for:
- receiving a device public key of the electronic device and authentication information of the electronic device from a first application server associated with a first mobile application installed on the electronic device;
- validating the authentication information using reference data stored in an active directory;
- creating an authentication token for the electronic device post-validation of the authentication information;
- signing the authentication token with a server signature using a server private key, wherein the server signature and the server private key are associated with a system;
- transmitting the authentication token to the electronic device via the first application server post-signing, wherein the authentication token transmitted to the electronic device is further accessible to a second application server, and wherein the second application server is associated with a second mobile application installed on the electronic device;
- enabling the electronic device to access the first mobile application based on the authentication information validated;
- receiving the authentication token from the second application server associated with the second mobile application installed on the electronic device, wherein the authentication token received is signed with a device signature using a device private key, and wherein the device signature and the device private key are associated with the electronic device;
- authorizing the authentication token by verifying the device signature and the server signature on the authentication token using the device public key and a server public key, wherein the server public key is associated with the system;
- transmitting the authentication token authorized to the electronic device via the second application server; and
- enabling the electronic device to access the second mobile application using the authentication token authorized.

* * * * *